UNITED STATES PATENT OFFICE.

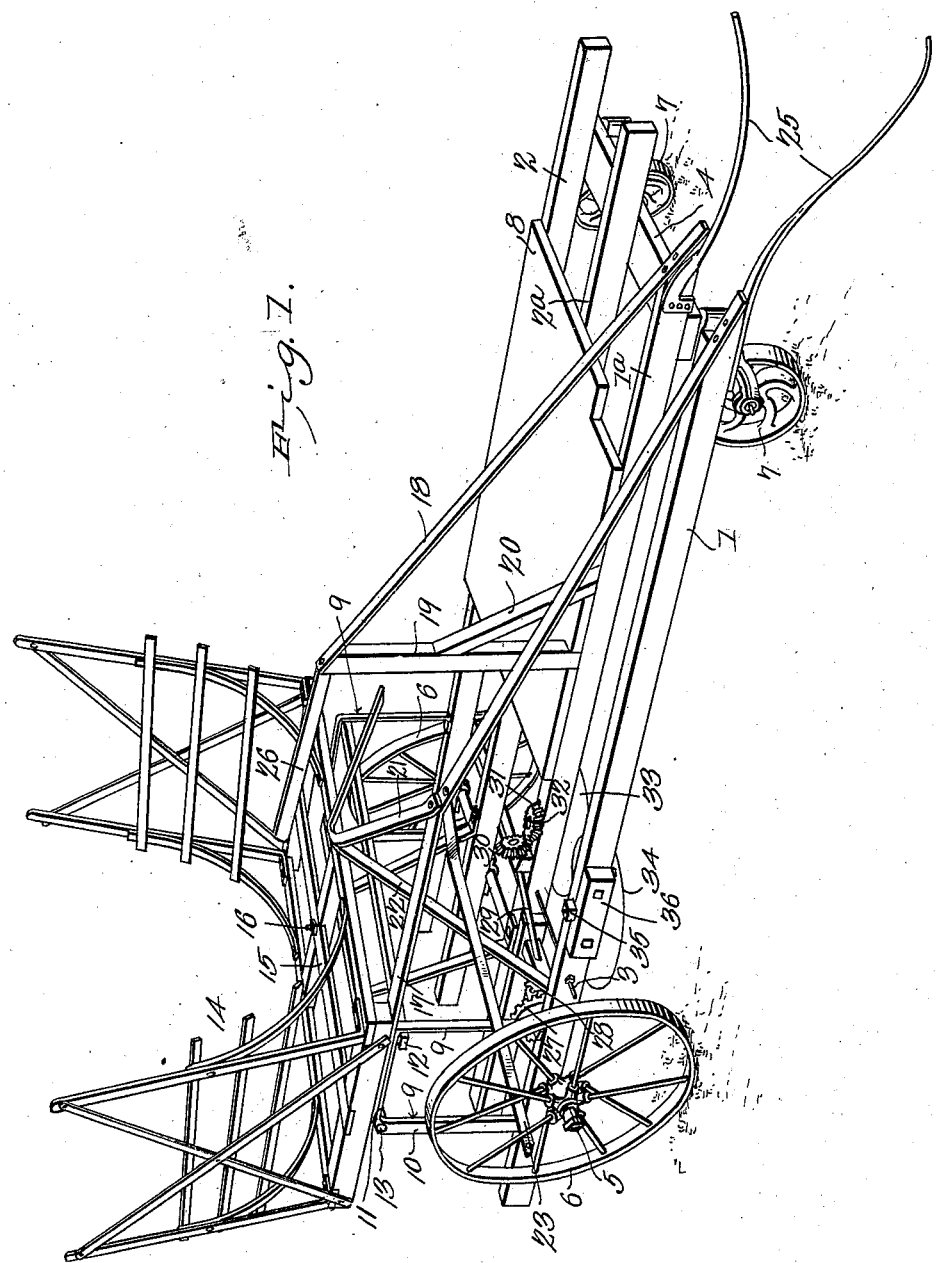

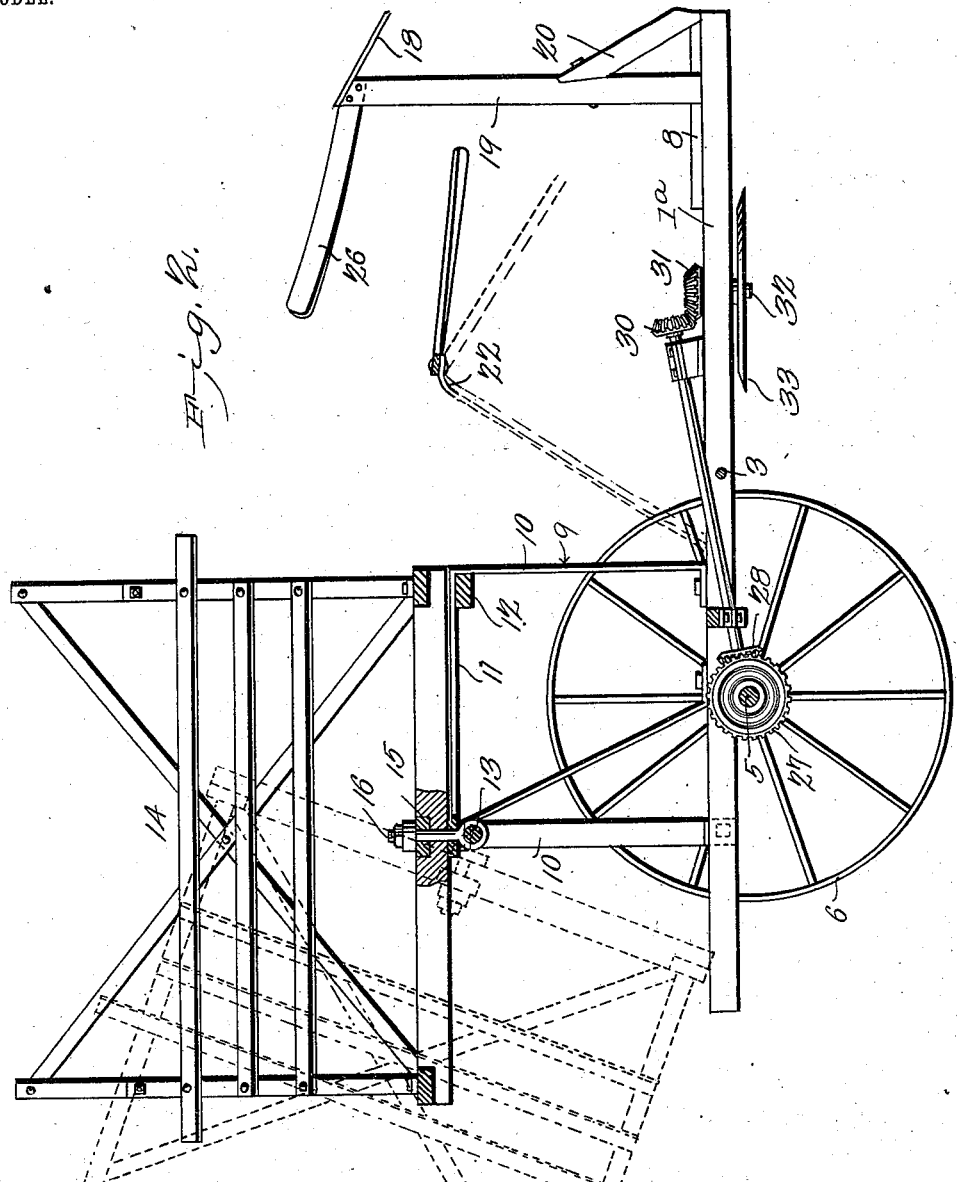

ISRAEL D. HIGHLEYMAN AND JOHN L. LAMB, OF CHETOPA, KANSAS; SAID LAMB ASSIGNOR TO SAID HIGHLEYMAN.

CORN HARVESTER AND SHOCKER.

SPECIFICATION forming part of Letters Patent No. 723,775, dated March 24, 1903.

Application filed July 31, 1902. Serial No. 117,891. (No model.)

*To all whom it may concern:*

Be it known that we, ISRAEL DAY HIGHLEYMAN and JOHN L. LAMB, citizens of the United States, residing at Chetopa, in the county of Labette and State of Kansas, have invented a new and useful Corn Harvester and Shocker, of which the following is a specification.

This invention relates to corn harvesters and shockers of that class in which the corn after being cut by means of rotary blades mounted in the frame of the machine is placed in a receptacle, tied, and afterward deposited upon the ground as a shock.

Our invention has for its object to provide a device of this class which shall possess superior advantages in point of simplicity, durability, and general efficiency, in which the corn as it is being guided to the cutting mechanism shall likewise be guided into a yoke or supporting device, where it is gathered and retained in a convenient position to be tilted into a receptacle.

A further object of the invention is to so construct and mount the said receptacle that its position may be reversed by swinging it around upon a pivot while the stalks are being tied to form the shock and which afterward may be tilted to deposit the shock on the ground.

With these and other objects in view the invention consists in the improved construction, arrangement, and combination of parts which will be hereinafter fully described, and particularly pointed out in the claims.

In the accompanying drawings, Figure 1 is a perspective view of a corn-harvester constructed in accordance with our invention. Fig. 2 is a sectional elevation showing the rear part of the machine.

Corresponding parts in the figures are indicated by like numerals of reference.

The frame of our improved machine is composed of two pairs of longitudinal beams or bars, (denoted, respectively, by 1 1ᵃ and 2 2ᵃ,) the beams 1 and 2 constituting the outer frame-beams, as shown. The several beams are connected near their rear ends by means of cross bars or braces 3, which may be arranged in any suitable way to insure the necessary stability of the device. At or near the front end of the frame the beams 1ᵃ, 2, and 2ᵃ are connected by the cross bar or brace 4, while the space between the bars 1 and 1ᵃ is left open to constitute a guideway by which the cornstalks are guided to the cutting mechanism, to be hereinafter described. The rear end of the frame is supported upon an axle 5, having traction-wheels 6. The front end of the frame is supported upon guide-wheels 7, of ordinary construction, forming casters which will readily adapt themselves to any change in the direction of the draft. The frame-beams 1ᵃ, 2, and 2ᵃ support a platform 8, upon which the operator stands during the operation of the machine.

Upon the frame-beams 1 and 2, near the rear ends thereof, are mounted brackets 9 9, consisting of uprights 10, connected at their upper ends by cross-bars 11, said cross-bars being connected at their front ends by a transverse bar or brace 12 and at their rear ends by a rock-shaft 13.

14 designates a suitably-constructed receptacle or cradle the central bottom bar of which, 15, is connected pivotally with the rock-shaft by means of a bolt 16, serving as a swivel upon which the said cradle may be turned in a horizontal plane.

From the upper side of the bracket 9, mounted upon the frame-beam 1, extends a horizontal guide-bar 17, which is extended forwardly and downwardly to the front end of the frame-beam 1, with which its lower end is securely connected. Another guide-bar 18 extends downwardly and forwardly from the upper end of a post 19, rising from the frame-bar 1ᵃ and to the front end of the frame-beam 1ᵃ, where it is secured, as shown. The post 19, which is held securely by means of a brace 20, is located some distance in front of the cradle, as will be readily seen in the drawings.

To the guide-bar 17, at the point at which it is bent in a downward direction, is secured a rearwardly-extending yoke 21, which is connected by a brace 22 with the frame-bar 1. Another brace 23 connects the point of attachment 21 with the frame-bar 1, near the rear end of the latter. It is obvious that suitable braces and supporting means may be arranged at any point or points where their presence shall be found desirable or necessary.

At the front ends of the frame-beams 1 and 1ª are arranged forwardly-extending curved guides 25, which serve to pick up the corn that is down and to guide it between the frame-beams 1 and 1ª and the guide-bars 17 and 18. To the upper end of the post 19 is secured a laterally-extending spring 26, which serves to prevent the corn from entering between the point of the yoke 21 and the said post, or, in other words, to guide it into the said yoke, which is so positioned that the stalks when severed may be readily tilted into the cradle or receptacle by the operator standing upon the platform 8.

The traction-wheels 6, or at least one of them, is mounted securely upon the axle 5, which revolves therewith. Said axle carries a bevel-gear 27, meshing with a pinion 28 at the lower end of a shaft 29, which is mounted in an inclined position in suitably-arranged boxes or bearings. The said shaft 29 carries at its upper forward end a pinion 30, meshing with a pinion 31 upon the upper end of a shaft 32, journaled vertically in the frame-beam 1ª and which carries at its lower end a disk or cutter 33, engaging a similar disk or cutter 34, mounted upon a vertical shaft 35, journaled in the frame-beam 1 or in a boxing 36, attached thereto. The disks or cutters 33 and 34 overlap each other in the usual manner, so as to engage and sever the lower ends of the stalks presented thereto by exercising a cutting or shearing action thereon, the cutting-disk 34 being operated simply by frictional contact with the disk 33, it being found unnecessary to impart direct motion thereto.

From the foregoing description, taken in connection with the drawings hereto annexed, the operation and advantages of our invention will be readily understood. Draft may be attached in any suitable manner to the front end of the machine, which is guided over the field in such a manner as to engage a row of corn. The stalks are guided between the frame-beams 1 and 1ª and the guide-bars 17 and 18, which serve, in conjunction with the guides 25, to elevate fallen and leaning stalks to an upright position, in which they are guided by the spring 26 into the yoke 21. About this time the lower ends of the stalks are engaged by the cutting-disks, whereby they are severed, and they are then tilted by the operator, who stands upon the platform, into the cradle. When a sufficient quantity has accumulated, the latter is swung around, presenting the tops of the stalks to the operator, who may thus conveniently tie the shock, which is then dumped, butt-ends first, upon the ground by simply tilting the cradle or receptacle upon the rock-shaft.

It will be evident to those skilled in the art to which our invention appertains that it is susceptible of structural modifications which need in no wise detract from its value or efficiency. We desire, therefore, to have it understood that we do not limit ourselves to the precise construction or arrangement of parts herein set forth, but reserve to ourselves the right to any changes and modifications which may be resorted to without detracting from the utility or departing from the spirit and scope of our invention.

Having thus described our invention, we claim and desire to secure by Letters Patent of the United States—

1. In a device of the class described, the combination with a platform, of a frame comprising two pairs of longitudinal beams, one pair forming guides and supporting the cutting mechanism, and the other pair together with the inner bar of the first pair supporting the platform which also serves to connect and brace said frame-beams, substantially as set forth.

2. In a device of the class described, a frame comprising two pairs of longitudinal beams, one pair of which form stalk-guides and support the cutting mechanism, brackets supported upon the outer beam of each pair, and a cradle supported pivotally and tiltingly upon said brackets, substantially as set forth.

3. In a corn harvester and shocker, a frame having a pair of horizontal beams forming stalk-guides, inclined guide-bars suitably arranged and supported, a receiving-yoke connected with one of said inclined guide-bars, and a receptacle disposed in rear of said yoke and consisting of a table pivotally and tiltingly mounted upon the frame of the machine, substantially as set forth.

4. In a corn harvester and shocker, the combination of stalk-guiding means, cutting mechanism, a receiving-yoke, and a cradle disposed in rear of the latter to receive the severed stalks from said yoke, substantially as set forth.

5. In a corn harvester and shocker, the combination of stalk-guiding means, cutting mechanism, a receiving-yoke, a spring disposed to guide the stalks into said yoke, and a receptacle disposed in rear of the latter to receive the severed stalks, substantially as set forth.

6. In a corn harvester and shocker, the combination of stalk-guiding means, cutting mechanism, a receiving-yoke, a spring disposed in front of the latter to guide the stalks into said yoke, and a receptacle consisting of a cradle disposed pivotally and tiltingly in rear of said yoke, substantially as set forth.

In testimony that we claim the foregoing as our own we have hereto affixed our signatures in the presence of two witnesses.

ISRAEL D. HIGHLEYMAN.
JOHN L. LAMB.

Witnesses:
H. W. BEDELL,
E. D. BATES.